US011921469B2

(12) United States Patent
Meissner et al.

(10) Patent No.: US 11,921,469 B2
(45) Date of Patent: Mar. 5, 2024

(54) CONTACT RESPONSIVE METRONOME

(71) Applicant: Clikbrik, LLC, Brooklyn, NY (US)

(72) Inventors: Konrad Meissner, Brooklyn, NY (US); Edwin Booth, Brooklyn, NY (US); Michael Glaser, Philadelphia, PA (US); Carla Diana, Philadelphia, PA (US)

(73) Assignee: Clikbrik, LLC, Brooklyn, NY (US)

( * ) Notice: Subject to any disclaimer, the term of this patent is extended or adjusted under 35 U.S.C. 154(b) by 486 days.

(21) Appl. No.: 17/202,310

(22) Filed: Mar. 15, 2021

(65) Prior Publication Data

US 2021/0200158 A1 Jul. 1, 2021

Related U.S. Application Data

(63) Continuation-in-part of application No. 15/931,581, filed on May 13, 2020, now Pat. No. 10,962,931, (Continued)

(51) Int. Cl.
*G04F 5/02* (2006.01)
*G10H 1/40* (2006.01)
(Continued)

(52) U.S. Cl.
CPC ............... *G04F 5/025* (2013.01); *G10H 1/40* (2013.01); *G10H 1/46* (2013.01); *G10H 3/146* (2013.01);
(Continued)

(58) Field of Classification Search
CPC . G04F 5/025; G10H 1/40; G10H 1/46; G10H 3/146; G10H 2210/076; G10H 2220/185
(Continued)

(56) References Cited

U.S. PATENT DOCUMENTS 4,418,598 A * 12/1983 Klynas .................. G10H 3/146 84/DIG. 12
4,479,412 A * 10/1984 Klynas .................. G10H 3/143 84/DIG. 12
(Continued)

FOREIGN PATENT DOCUMENTS

CN 104751834 A * 7/2015
JP 2008216023 A * 9/2008

OTHER PUBLICATIONS

Supplemental European Search Report dated Jun. 6, 2019 in European Patent Application No. 16862889, pp. 6.
(Continued)

*Primary Examiner* — Christina M Schreiber
(74) *Attorney, Agent, or Firm* — Ichthus International Law PLLC

(57) ABSTRACT

A metronome includes a body, a sensor coupled to the body and a controller in communication with the sensor. The sensor is configured to detect one or more strikes by a user of the metronome. The controller is configured to receive a first user input to select a tap tempo mode, detect via the sensor a strike by the user on the body of the metronome, determine a tempo based on a plurality of strikes by the user. The controller is further configured to detect modulation of how the strikes are made to the body of the metronome and automatically adjust the tempo based on the detected modulation of the strike.

6 Claims, 8 Drawing Sheets

Related U.S. Application Data which is a continuation of application No. 15/772,517, filed as application No. PCT/US2016/060137 on Nov. 2, 2016, now Pat. No. 10,671,024.

(60) Provisional application No. 62/250,367, filed on Nov. 3, 2015.

(51) Int. Cl.
*G10H 1/46* (2006.01)
*G10H 3/14* (2006.01)

(52) U.S. Cl.
CPC . *G10H 2210/076* (2013.01); *G10H 2220/185* (2013.01)

(58) Field of Classification Search
USPC ........................................................ 84/484
See application file for complete search history.

(56) References Cited

U.S. PATENT DOCUMENTS

| | | | | | |
|---|---|---|---|---|---|
| 7,358,432 | B2 * | 4/2008 | Risley | G09B 15/00 | 84/611 |
| 7,557,287 | B2 | 7/2009 | Wilson | | |
| 8,017,853 | B1 * | 9/2011 | Rice | G10H 1/42 | 84/615 |
| D798,748 | S * | 10/2017 | Meissner | D10/43 | |
| 2002/0062729 | A1 * | 5/2002 | Sagastegui | G10H 3/146 | 84/738 |
| 2004/0250672 | A1 * | 12/2004 | Moodie | G10H 1/40 | 84/636 |
| 2004/0255756 | A1 * | 12/2004 | Nagakura | G04F 5/025 | 84/484 |
| 2006/0101983 | A1 * | 5/2006 | Boxer | G04F 5/025 | 84/484 |
| 2006/0117937 | A1 * | 6/2006 | Lawliss | G04F 5/025 | 84/484 |
| 2007/0028746 | A1 * | 2/2007 | Herring | G10D 3/173 | 84/322 |
| 2007/0089592 | A1 * | 4/2007 | Wilson | G04F 5/02 | 84/612 |
| 2008/0034948 | A1 * | 2/2008 | Sumita | G10H 1/0008 | 84/636 |
| 2017/0285578 | A1 * | 10/2017 | Vogels | G04F 5/025 | |
| 2019/0012995 | A1 * | 1/2019 | Lupini | G10D 13/03 | |
| 2019/0079462 | A1 * | 3/2019 | Meissner | G10H 1/46 | |
| 2020/0310358 | A1 * | 10/2020 | Meissner | G10H 1/46 | |
| 2021/0200158 | A1 * | 7/2021 | Meissner | G10H 1/46 | |

OTHER PUBLICATIONS

International Search Report and Written Opinion dated Jan. 24, 2017 in PCT Patent App. No. PCT/US2016/060137 filed Nov. 2, 2016, pp. 5.

* cited by examiner

CONTACT RESPONSIVE METRONOME

CROSS REFERENCE TO RELATED APPLICATIONS

This application is a continuation-in-part application of U.S. patent application Ser. No. 15/931,581, filed May 13, 2020, which is a continuation of U.S. patent application Ser. No. 15/772,517, filed Apr. 30, 2018, which claims benefit of U.S. Provisional Patent Application No. 62/250,367 filed on Nov. 3, 2015.

INCORPORATION BY REFERENCE

U.S. patent application Ser. No. 15/931,581, filed May 13, 2020, Ser. No. 15/772,517, filed Apr. 30, 2018, and U.S. Provisional Patent Application No. 62/250,367 filed on Nov. 3, 2015 are incorporated herein by reference in their entirety.

FIELD OF THE DISCLOSURE

The present invention relates to a metronome.

BACKGROUND

Musicians can use a metronome to help keep a steady tempo as they play a musical instrument.

SUMMARY

In an embodiment, a metronome is provided for use by a user. The metronome includes a body, a sensor coupled to the body and a controller in communication with the sensor. The controller is configured to receive a first user input to select and enter into a tap tempo mode, detect via the sensor a plurality of strikes by the user on the body of the metronome, determine a tempo based on the plurality of strikes by the user. The controller may be further configured to detect modulation of how the strikes are made to the body of the metronome and automatically adjust the tempo based on the detected modulation of the strikes by the user.

In another embodiment, the tempo is determined based on a predetermined number of consecutive strikes by the user on the body of the metronome.

In a further embodiment, the tempo is increased or decreased when the speed of the strikes is increased or decreased.

In yet another embodiment, when no strike by the user is detected after a plurality of consecutive beats, the controller is further configured to save the tempo as a current tempo setting and exit the tap tempo mode of the metronome.

In another embodiment, the controller of the metronome is further configured to receive a second user input to select an accent beat rate which is a beat that has a distinct sound different from regular beats that the metronome plays, and play the accent beat among the regular beats as a time signature.

In an embodiment, a metronome can have a first sensor and a controller in communication with the first sensor. When the controller receives a signal from the first sensor indicating an event, the controller, in response, generates a signal to achieve at least one of the following operation conditions: (i) set a tempo based on a characteristics of the event; (ii) mute or un-mute the speaker based on a characteristics of the event; (iii) turn on and off the metronome based on a characteristics of the event; and (iv) place the metronome to one of a sleep mode and an awake mode. In an embodiment, the signal can be sent from the sensor to the controller to achieve the above operating conditions.

In another embodiment, the event that causes the controller to achieve an operating condition is at least one of a strike and a plurality of strikes, wherein the tempo is based on an average time between each of the plurality of strikes, and wherein the tempo starts to play a beat as a continuation of the plurality of strikes.

In yet another embodiment, the metronome can further have a processor configured to calculate the average time between each of the plurality of strikes.

In yet another embodiment, the first sensor is capable of detecting at least one of a strike, a motion, a sound of a predetermined wavelength, and a vibration.

In another embodiment, the controller is in communication with a speaker and is configured to at least one of increase and decrease the volume of the speaker.

In yet another embodiment, the metronome includes a tempo controller that is capable of adjusting the tempo and a tempo display in communication with the tempo controller, wherein the tempo display illustrates the tempo set by the tempo controller.

In an embodiment, wherein the tempo controller is designed to receive a p011ion of an adjusting device so that a user can adjust the tempo of the metronome with the adjusting device.

In another embodiment, the metronome includes at least one of a power button, at least one volume button, an accent button, an audio jack, and a USB port.

In a further embodiment, the metronome includes at least one mounting hole

In yet another embodiment, the metronome includes a body having an impact absorbing material to cushion a force associated with the event.

In another embodiment, the impact absorbing material is in a form of an interchangeable sleeve.

In an embodiment, the metronome can have a second sensor capable of detecting at least one of a strike, a motion, a sound of a predetermined wavelength, and a vibration.

In another embodiment, a metronome can have a sensor capable of detecting an event and a controller in communication with the sensor. When the controller receives a signal from the sensor indicating an occurrence of the event, the controller, in response, generates a signal to adjust a characteristic of the metronome that corresponds to the event.

In a further embodiment, the metronome can have an adjustment device configured to adjust a plurality of functions in the metronome In yet another embodiment, the metronome can have a functionality selector configured to select the function of the adjustment device.

In a further embodiment, the event is at least one strike to the metronome.

In yet another embodiment, the at least one strike is a plurality of strikes. Additionally, the characteristic of the metronome is a tempo. The tempo can be adjusted by taking an average time between each of the plurality of strikes, and wherein the tempo starts to play a beat as a continuation of the plurality of strikes.

In a further embodiment, the characteristic of the metronome is one of unmuting and muting the metronome.

In an embodiment a method for modifying a metronome output includes the steps of striking the metronome a predetermined number of times, automatically adjusting the tempo based on the average amount of time between each of the predetermined number of strikes, and start playing the tempo from a last strike.

In another embodiment, the method for modifying a metronome output further includes striking the metronome a second predetermined number of times to one of mute and unmute the metronome.

Additional features and advantages of various embodiments will be set forth, in part, in the description that follows, and will, in part, be apparent from the description, or can be learned by the practice of various embodiments. The objectives and other advantages of various embodiments will be realized and attained by means of the elements and combinations particularly pointed out in the description herein.

BRIEF DESCRIPTION OF THE DRAWINGS

The present invention in its several aspects and embodiments solves the problems discussed herein and significantly advances the technology of musical equipment. The present invention can become more fully understood from the detailed description and the accompanying drawings, wherein.

Throughout this specification and figures like reference numbers identify like elements.

DETAILED DESCRIPTION OF THE EMBODIMENTS

In its broad and varied embodiments, the inventions disclosed herein regarding a device that produces regular, metrical ticks (e.g., beats, clicks, visual)—settable in beats per time (e.g., minute). These ticks can represent a fixed, regular aural pulse or visual indicator. Such devices are regularly used by musicians to help them keep a tempo as they play. For example, such a device can be a metronome.

In addition to its ordinary and customary meaning, the term "strike" or a derivative thereof is used synonymously with "impact," "contact," and "an applied force" when referring to striking the metronome. Furthermore, in addition to its ordinary and customary meaning, the term "event" or a derivative thereof can be defined as any type of input or action that can result in the adjustment of a characteristic of the metronome.

Figure 1:
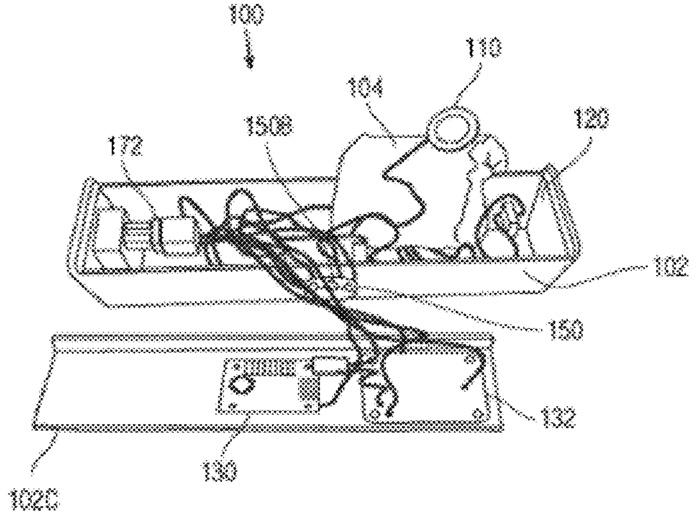
FIG. 1 is a view of an interior of an exemplary metronome.

In an embodiment, as shown in FIG. 1, metronome 100 can have one or more of the following components: a body 102, an input device, such as a sensor 110, an output device, such as a speaker 120, a controller 130, a tempo controller 150, and a power source 172. Additionally, the metronome 100 can have a processor, a memory, and a computer executable program code. These components can make communication between different parts or components of the metronome possible so that the metronome can perform the requested function. The body 102 can be in any shape, form, or size. For example, it can be in a shape of a visible pendulum, a cylinder, rectangular prism, cube, triangular prism, octagonal prism, triangular pyramid, square pyramid, cone, a sphere, a disc, or other shape. The term "impact absorbing material," unless otherwise stated, are intended to encompass any energy absorbing materials that can be used to make an object resilient to impact and which through such use can reduce the likelihood of damage to the object when impacted by a second object. This definition encompasses, but is not limited to for example, a drum stick striking a portion of a metronome having an impact absorbing material. Such impact absorbing materials can be selected from materials that have at least one of the following properties: reversibly deforming, polymer, metal, plastic, amorphous pliable, impact absorbing, force absorbing, and/or cushioning absorbing materials.

Referring to FIGS. 2A-2E, the body 102 of the metronome 100 can be made of any material, such as a polymeric, a non-polymeric composition, or a mixture of polymeric and non-polymeric material, a metal or a metal aggregate, wood, and/or stone. In an embodiment, the body 102 can be made, in part or in whole, of an impact absorbing material to absorb the force of impact when the metronome 100 is struck, for example, by a drum stick.

Figure 2A:
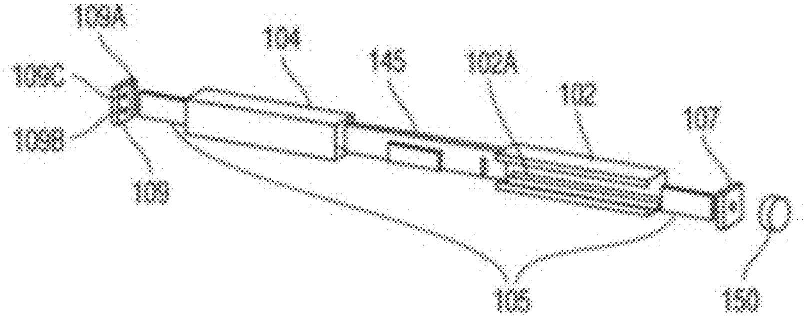
FIG. 2A is a view of an interior of another exemplary metronome.
Figure 2B:
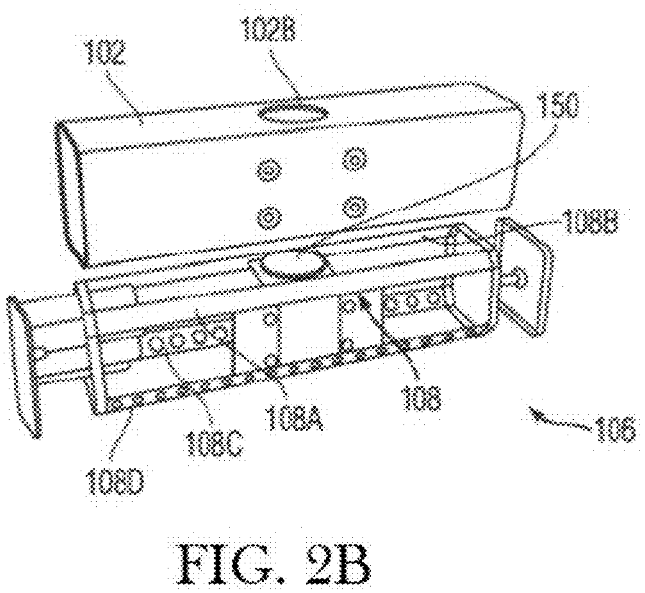
FIG. 2B is a view of the framework of an exemplary metronome.
Figure 2C:
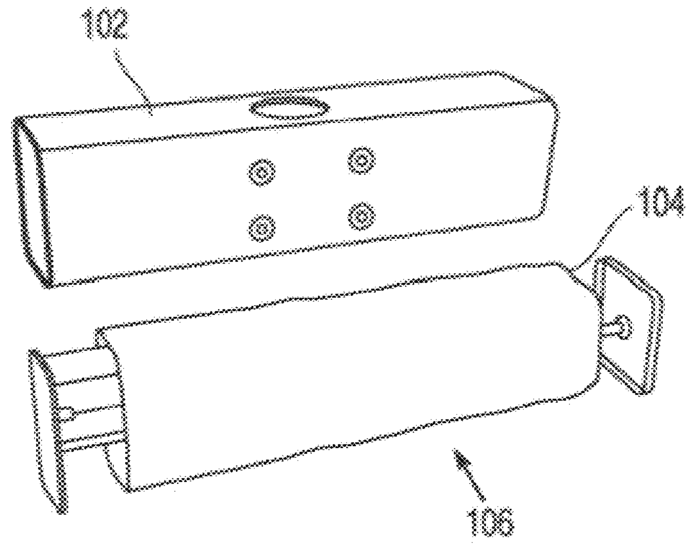
FIG. 2C is a view of the framework of a metronome having impact absorbing material that extends the length of the body.
Figure 2D:
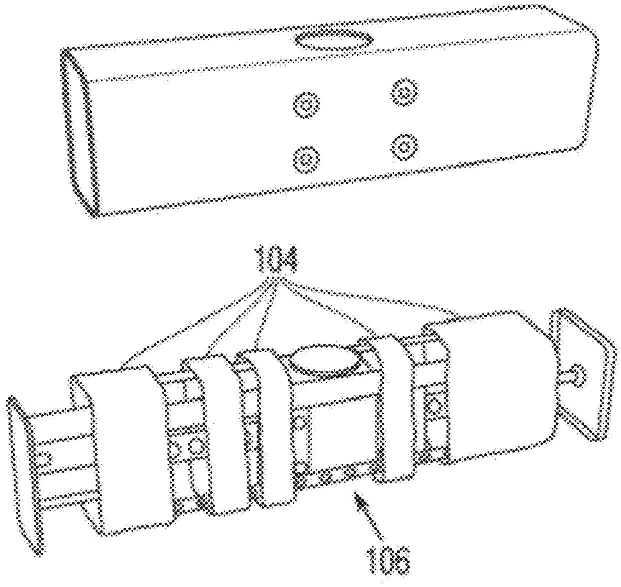
FIG. 2D is a view of the framework of a metronome having impact absorbing material intermittently placed around the framework.

In another embodiment, the body 102 of the metronome 100 can have an outer layer and an impact absorbing material 104 that can be positioned on or under the outer layer. In an embodiment, the outer layer can be made, at least in part, of the impact absorbing material. In one example, as shown in FIGS. 2A, 2C, and 2D, the impact absorbing material 104 can be an inner impact absorbing material and can be secured to or configured in contact with and/or adhered to the interior surface of the body 102 or between the body 102 and an interior frame 106 (if any). In one example, the impact absorbing material 104 can be placed or configured in spaces between different components of the metronome 100, as shown in FIG. 1.

Figure 2E:
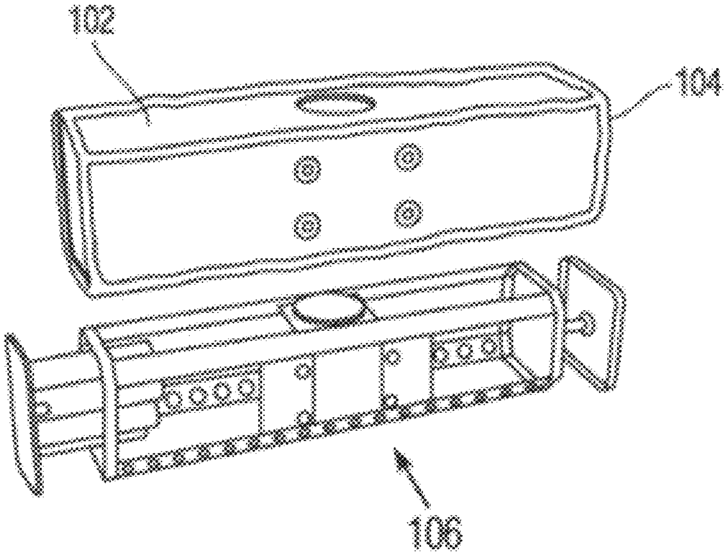
FIG. 2E is a view of the framework of a metronome having impact absorbing material placed around the edges of the body.
Figure 3A:
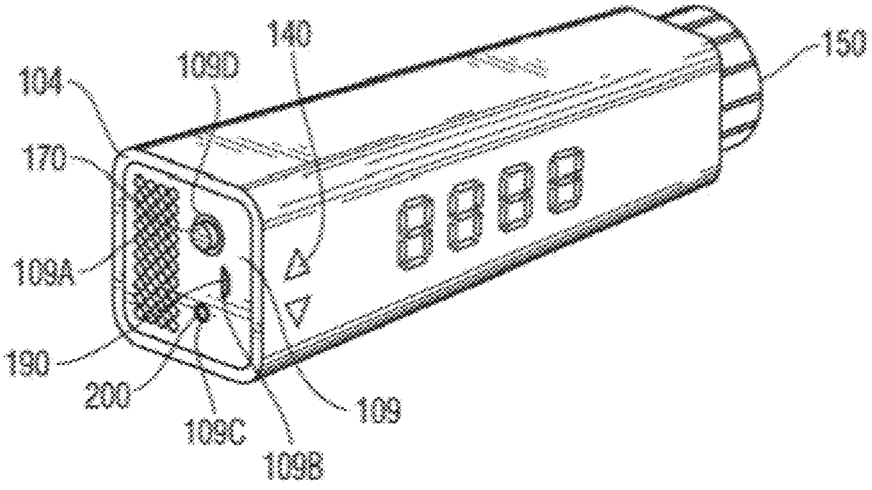
FIG. 3A is a back perspective view of an exemplary metronome having the impact absorbing material placed over the body.
Figure 3B:
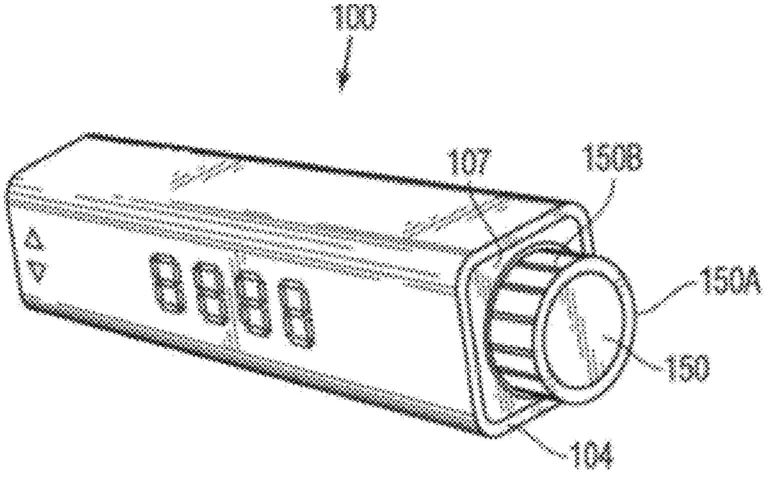
FIG. 3B is a front perspective view of the exemplary metronome of FIG. 3A.

In another example, as shown in FIGS. 2E, 3A, and 3B, the impact absorbing material 104 can be secured to or configured in contact with and/or adhered to the exterior of the metronome 100, such as on the body 102. For example, as shown in FIGS. 3A and 3B, the impact absorbing material 104 can be in a shape of a sleeve that can be placed or configured on the exterior of the metronome 100, such that the impact absorbing material 104 can cover the entire length of the body 102. In one example, as shown in FIG. 2E, the impact absorbing material 104 can be placed or configured on at least a portion of the exterior surface of the body 102. For example, it can be placed such that it covers at least the edges of the body 102.

As shown in FIGS. 2A, 2C, 3A, and 3B, the impact absorbing material 104 can extend the entire length of the body 102. Alternatively, the impact absorbing material 104 can overlap, cover, be in contact with and/or adhere to a portion of the interior of the body 102, for example, the impact absorbing material 104 can be intermittently configured around and/or to at least, in part, surround the framework 106, as shown in FIG. 2D. An example, the impact absorbing material 104 can be one or more of a material such as rubber, neoprene, silicone, polymers, plastics, and other materials. In a non-limiting example, the impact absorbing material can be made of or include silicon and can be in a shape of a sleeve.

In an embodiment, the body 102 and/or the framework 106 can be manufactured by a broad variety of methods. For example, the body 102 and/or the framework 106 can be manufactured by casting, molding, forming, machining, and joining. Casting process can use processes such as centrifugal casting, continuous casting, die casting, evaporative pattern casting to name a few. Molding process can use one or more processes such as injection molding, compression molding, extrusion, blow molding, dip molding, and thermoforming to name a few. Forming process can use one or more of forging, rolling, extrusion, pressing, bending, and shearing to name a few. Machining process can use one or more of milling, turning, drilling, reaming, tapping sawing, shaping, and planning to name a few. Joining process can use one or more of welding, brazing, soldering, sintering, adhesive bonding, press fitting, and fastening to name a few. The body 102 and/or the framework 106 can also be manufactured by a 3D printing process.

In an embodiment, as shown in FIG. 2A, the body 102 is designed such that a portion or a side of the body 102 can be open or have an opening or an access to reveal at least a portion of a printed circuit board (PCB) 145. In this embodiment, the open side of the body 102 can also have at least one filler panel, such as a pair of filler panels 105. The filler panels 105 can be configured and/or secured to any portion of the metronome 100. For example, each filler panel 105 can be configured and/or secured at each end of the metronome 100. In one example, when each of the filler panels 105 is configured and/or secured at each end of the metronome 100, each filler panel 105 can cover at least a portion of the PCB 145.

Each of the filler panels 105 can be made of the same material as the body 102 or can be made of material different from the body 102. In an example, the filler panels 105 can be made of any material, such as a polymeric, a non-polymeric composition, or a mixture of polymeric and non-polymeric material, a metal or a metal aggregate, wood, and/or stone. Similar to the body 102, the filler panels 105 can be made of an impact absorbing material. In another embodiment, each of the filler panels 105 can include a first material and an impact absorbing material 104, which can be secured to or configured in the interior side of the first material of the filler panels 105 or can be secured or configured on the exterior of the filler panels 105.

The shape of each of the filler panels 105 can be such that each of the filler panels 105 can be inserted and be secured inside the metronome 100. For example, each of the filler panels 105 can be friction fitted at each end of the metronome 100. The shape of each of the filler panels 105 can be in a shape of a disc, semi sphere, square, triangle, and rectangle. In an embodiment, as shown in FIG. 2A, each of the filler panels 105 can be in a shape of a rectangle having a length such that when inserted in to the open face of the body 102, one end of each of the filler panels 105 is at each respective end of the metronome 100 and the other end of each of the filler panels 105 can come in contact to one another (i.e., the combination of the two filler panels 105 stretch the entire length of the metronome 100). In another embodiment, the combination of the length of each of the filler panels 105 is shorter than the entire length of the metronome 100. For example, the combination of the length of each of the filler panels 105 can cover at least one of three-quarters (%) of the entire length of the metronome 100, two-thirds (%) of the entire length of the metronome 100, one-half (Yz) of the entire length of the metronome 100, one-third (VJ) of the entire length of the metronome 100, one-quarter (%.) of the entire length of the metronome 100, one-sixth (⅙) of the entire length of the metronome 100, or one-eight (Vs) of the entire length of the metronome 100, or less than one-eight (Vs) of the entire width of the metronome 100, to name a few.

Each of the rectangular shaped filler panels can have a width that is at least the same as the width of the metronome 100 or shorter. For example, the width of each filler panel 105 can be at least one of three-quarter (%) of the entire width of the metronome 100, two-thirds (%) of the entire width of the metronome 100, one-half (Yz) of the entire width of the metronome 100, one-third (VJ) of the entire width of the metronome 100, one-quarter (1,4) of the entire width of the metronome 100, one-sixth (⅙) of the entire width of the metronome 100, or one-eight (Vs) of the entire width of the metronome 100, or less than one-eight (1/s) of the entire width of the metronome 100, to name a few.

In one exemplary embodiment, the metronome 100 can have a width of from about 1 inch or less to about 3 inches or more, for example, 2 inches. The metronome 100 can have a height of from about 1 inch or less to about 3 inches or more, for example, 2 inches and a length of from about 5 inches or less to about 10 inches or more, such as a length of about 8.25 inches. In one exemplary embodiment, when the tempo controller 150 is at one end of the metronome 100, the entire length of the metronome 100 (including the tempo controller) can be from about 5.2 inches or less to about 11 inches or more, such as a length of about 9 inches.

In one exemplary embodiment, the chassis or framework 106 make the body 102 or at least a portion of the body 102. In another embodiment, the body 102 can be separate from the chassis or framework 106. In the embodiment wherein the body 102 can be separate from the chassis or framework 106, the body 102 can be placed over the chassis or framework 106. The framework 106 can include a support structure 108 to strengthen the framework 106. The support structure 108 can include at least one rod-like structure 108A, such as at least two rod-like structures 108A and 108B, at least three rod-like structures 108A, 108B, and 108C, or at least four rod-like structures 108A, 108B, 108C, and 108D. The position of each of the rod-like structures 108A, 108B, 108C, and 108D with respect to one another can be such that they create a space sufficiently large enough to position and secure each of the components of the metronome 100. Furthermore, the rod-like structures 108A, 108B, 108C, and 108D can be designed to withstand a strike from a device or an instrument, such as a drum stick. For example, the rod-like structures 108A, 108B, 108C, and 108D can withstand a force of from at least about 100 Newton (N) or less. For example a force of from about 1 N or less to about 100 N or more, such as a force of from about 10 N to about 90 N, such as a force of from about 20 N to about 80 N, for example, 30 N, 40 N, 50 N, 60 N, or 70 N, to name a few.

As shown in FIG. 2A, the body 102 includes an inner surface that can have a set of ridges or rails 102A. The purpose of the ridges 102A is to strengthen the body 102 to better withstand the striking force of the musical instrument, such as a drum stick, striking the metronome 100. Moreover, the ridges 102A can create a rail-like structure to removably, but securely hold different components of the metronome 100. For example, as shown in FIG. 2A, each of the filler panels 105 can slide between the ridges 102A so that they can be removably configured and secured inside the metronome 100. In one embodiment, other components of the metronome 100, such as the controller 130 and/or the sensor 110 can be placed on or secured to a printed circuit board (PCB) 145, which can then be inserted/slid between the ridges 102A so that it can be removably configured and secured inside the metronome 100.

Herein, any system and/or software disclosed can execute rule-based logic and/or other processing and/or other decision making by processing and/or using a single "criterion" or a plurality of criterion herein as "criteria". Where a decision or processing step can be executed based on a single criterion and/or event, the disclosure is intending to be broad and discloses a single criterion, at least one criterion, or criteria, or event. There is no limitation to the upper number of criteria and/or events which can be used in the logic of the controller to effect a condition of the metronome. There is no limitation that criteria (plural) be used, if a single criterion (singular) can allow for a processing or logical step to be made.

Throughout this application, it is understood that the terms "computer executable software code", "computer readable code", "program readable code" and computer executable code are used synonymously and in addition to their ordinary and customary meaning encompasses the meaning of a set of instructions that can be read by and executed by a computer processor and/or system and/or computing device. The application is not limited regarding the nature and/or type of computer executable software code and encompasses any and all code readable and executable by a computer and encompasses and equivalents and/or means, such as the terms "a computer executable program code means" and "a computer readable program code means" which are used herein synonymously and which are intended to encompass any time of software and/or program code and/or instructions readable and/or executable by a computing device and/or computer.

All of the embodiments herein can be made, used, implemented and executed by computer readable program code means. There is no limitation as to the type and nature of computer readable program code means which can be used to achieve the methods and calculations disclosed herein. The software products are not limited and can broadly be any software and or application product capable of processing the numerical methods and calculations disclosed herein. The software products can be applications, subroutines, mobile applications, smartphone applications, wireless applications, cloud-based applications, cloud-based services, or any by computer readable program code means adapted to achieve the methods disclosed herein. There is no limitation on the nature of the product whether the application is source code, compiled code, non-compiled code, downloaded code, compressed code, executable code. This disclosure expressly encompasses any product which provides the method herein to a use and which can provide to, implement, execute, support or enable a user to practice, make or use any method disclosed herein in any embodiment or part thereof.

All of the embodiments herein are transformative in nature. The disclosed methods are to be executed by a computer to transform data regarding at least one item with at least one attribute and an at least one uncertainty by computer means to achieve an output which can be perceived and utilized by a user of the methods disclosed herein.

The embodiments herein are highly transformative and are technological methods and means which advance computer and software technology and which are robust and transform input, parameters, criteria, knowledge and/or data into useful and value added information upon which a user can base a decision, or which is transformed through technology into information which in itself is a decision, a solution, a result, a product, an output and/or outcome. The transformation of input and/or data by the computer and software embodiments herein achieves decision support and/or decision results previously not possible. The embodiments herein are transformation technologies and are also computer integral technologies to achieve the transformations (e.g. computer processing, calculations, values, results, choices, solutions and outcomes) disclosed and achieved herein.

Numeric values and ranges herein, unless otherwise stated, also are intended to have associated with them a tolerance and to account for variances of design and manufacturing. Thus, a number can include values "about" that number. For example, a value X can be also intended to be understood as "about X". Likewise, a range of Y-Z can be also intended to be understood as within a range of from "about Y-about Z". Unless otherwise stated, significant digits disclosed for a number are not intended to make the number an exact limiting value. Variance and tolerance can be inherent in mechanical design and the numbers disclosed herein are intended to be construed to allow for such factors (in non-limiting e.g., ±10 percent of a given value). Likewise, the claims are to be broadly construed in their recitations of numbers and ranges.

Referring to FIG. 2A, the metronome 100 can have a pair of caps 107 and 109 at each end. In one example, the cap 107 can be secured at a first end of the metronome 100 and a tempo controller 150 can be proximate to, configured on, or rotatably secured to the cap 107. Although FIG. 2A illustrates that the tempo controller 150 is configured on the cap 107, it is understood that the tempo controller 150 can be configured on any part of the metronome 100.
For Example, as shown in FIG. 2B, the tempo controller 150 can be configured on the body 102. In one example, the cap 109 can be secured to a second end of the metronome 100. As shown in FIG. 2A, the cap 109 can include one or more cutouts. For example, the first cutout can include a plurality of holes 109A, such as wound holes, proximate to the location of the speaker 120. The cap 109 can also include a second cutout in a shape of a USB port (USB cutout 109B), proximate to or corresponding to a USB port 190 (see FIG. 3A). Additionally, the cap 109 can include a third cutout in a shape of an audio jack (audio jack cutout 109C), proximate to or corresponding to an audio jack port 200 (see FIG. 3A). It is understood that if other components of the metronome 100 are configured proximate to the cap 107 or the cap 109, the corresponding cap can include a cutout for that component. For example, as shown in FIG. 3A, the cap 109 can include an on/off switch cutout 109D for the on/off switch 170. Similarly, the body 102 can include a cutout corresponding to a component of the metronome 100. For example, as shown in FIG. 2B, the body 102 can include a cutout 102B to encompass the tempo controller 150.

In an embodiment, the sensor 110 can be any type of sensor capable of sensing a strike, a motion, a sound having a predetermined wavelength, and/or a vibration. For example, the sensor can be a piezoelectric sensor, an accelerometer, and/or a microphone capable of detecting a predetermined wavelength. In one example, the sensor 110 can be a piezoelectric shock sensor. In another example, the sensor can be an accelerometer capable of sending the acceleration created by striking the metronome 100 by an instrument. In another example, the sensor can be a microphone capable of detecting the sound wavelength generated when the metronome 100 is struck by an instrument.

In an embodiment, not shown in the Figures, the sensor 110 can be positioned in a remote location, such as the side of the snare drum. In this particular example, the sensor 110 can includes a communication device that enables the sensor to communicate with the metronome controller 130. In this example, the user can hit the side of the snare drum with the drum stick to activate or deactivate one or more of its built-in capabilities, such as tempo, volume, etc.

In an embodiment, a strike, a motion, a sound having a predetermined wavelength, and/or a vibration can be sensed by the sensor 110, which sends a change in sensor output signal to the processor. The processor having executable computer readable program codes executes a program logic which processes the change in sensor signal. As a result, the processor executes the computer readable program code to instruct the controller 130 to generate a signal to turn-off or turn-on the metronome 100, mute or un-mute the metronome 100, mute or un-mute the tempo or tap tempo, place the metronome 100 into a sleep mode or wake it up, or pause or un-pause the metronome 100. In one example, the controller 130, in response to the signal received from the sensor 110, can generate a signal and send it to a volume button board 132 to mute the metronome 100. The volume button board 132 can be part of the board containing the controller 130 or can be a separate board as shown in FIG. 1.

In one example, when the sensor 110 detects a plurality of hits or strikes, for example at least two hits, it determines the average time between each of the plurality of hits and calculates a new tempo based on the average calculated time between the plurality of hits. The metronome 100 then continues the tempo created by the user based on the user's plurality of hits.

The metronome 100 can also have at least one speaker 120 that is capable of converting a tempo signal to an audible wave. The speaker 120 can also be in communication with the controller 130 or with a separate controller.

In one example, when the metronome 100 is turned-on, the metronome generates a tempo determined or set by a user. As stated above, the user can set the tempo by a plurality of hits to the metronome 100 or a sensor 110 (if the sensor is not part of the metronome). The metronome 100 then it determines the average time between each of the plurality of hits and calculates a new tempo based on the average calculated time between the plurality of hits. The metronome 100 then continues the tempo created by the user based on the user's plurality of hits. In another example, the metronome 100 can be pre-programmed so that an action of the user tells the tempo to start the pre-programmed tempo. For example, the metronome 100 can be programmed so that when a user hits the metronome 100 three times, the metronome 100 plays a first tempo. If the user hits the metronome 100 four times, the metronome 100 plays a second tempo and so on.

When the user sets the tempo, the controller 130 sends a signal to the speaker 120 to convert the tempo electrical signal to an audible wave so that the user can hear the tempo. If the user decides to mute the tempo sound, the user can strike the metronome 100 with his/her musical instrument, such as a drum stick. The user can strike any part of the body 102 of the metronome 100 with a drum stick so that the sensor 110 can detect the strike. For example, the user can strike a portion of the body 102 where the rod-like structures 108A, 108B, 108C, and 108D are respectively configured.

By striking the metronome 100, the sensor 110 can detect at least one of motion, strike force, sound caused by, and/or the vibration caused by striking the metronome 100. The sensor 110, in response to detecting the strike of the drum stick on the metronome 100, can send a signal to the controller 130, which in turn can send a signal to the speaker to mute the speaker 120. As discussed above, in an alternative embodiment, the controller 130 can send a signal to the on/off switch 170 of the metronome 100 to turn off the metronome 100 or put it in a sleep mode. In this alternative embodiment, the controller 130, after receiving the signal from the sensor 110, can provide a signal to the on/off switch 170 to turn off the metronome 100. In another example, the controller 130, instead of or in addition to providing a signal to the on/off switch 170, it provides a signal to a power source 172. The power source 172, in response to receiving the signal from the controller 130, can limit the power distribution to at least the sensor 110 and the controller 130. The remaining components, such as the speaker 120 cannot receive power unless the power source 172 receives a second signal from the controller 130 commanding the power source 172 to also provide power to the remaining components of the metronome 100, such as the speaker 120

In the example above, where the controller 130 provides a signal to the on/off switch to turn off the metronome 100, when the metronome 100 is turned off, the user can turn on the metronome 100 by pressing the on/off switch 170. In the example above, when the metronome 100 is in a sleep mode, the user can turn on the metronome 100 by striking the metronome 100 with the drum stick. Given that the power source 172 provides power to the sensor 110 and the controller 130, when the metronome 100 is struck by the drum stick, the sensor 110 detects the force applied to the metronome 100 and, in response, sends a signal to the controller 130. The controller 130, in response to receiving the signal from the sensor 110, can send a signal to the power source 172 to provide power to the remaining components of the metronome, such as the speaker 120.

In an embodiment, as shown in FIG. 3B, the tempo controller 150 is located proximate to the cap 107. In this embodiment, the tempo controller 150 includes a sleeve-like structure 150A. The sleeve-like structure can be made of any material. In one example, the material of the sleeve-like structure 150A is a type of material with a high coefficient of friction, such that a user can place an end of a drum stick on the sleeve-like structure 150A and place a force on the drum stick to turn the tempo controller 150 without the end of the drum stick slipping off the sleeve-like structure 150A before turning the tempo controller 150. For example, the sleeve-like structure 150A can have a coefficient of friction ($\mu$) of from less than 0.25 to more than 1. For example, the coefficient of friction of the sleeve-like structure 150A can be in a range of from about 0.1 or less to about 1 or more, such as from about 0.25 to about 0.75, for example from about 0.3 to about 0.6, or from about 0.4 to about 0.5. Some exemplary materials that can be used as the sleeve-like structure 150A can be, but are not limited to, polymer based composition with or without a backing layer. For example, the material for the sleeve-like structure 150A can be, but are not limited to, silicon, acetal (POM), nylon (PA), poyphthalamide (PPA), polyetherentherketone (PEEK), polyphenylene sulfide (PPS), polybutylene terephthalate (PBT), thennoplastic polyimide (TPI), polycarbonate (PC), polyetherimide (PEI), rubber, or a combination thereof, or other materials and/or compositions. The silicon based composition can be adhered to a gripping portion of the tempo controller 150 and can have one or more of the following shapes/patterns 150B: curved, non-linear, zigzag, concave, convex, ribbed, and/or flat. In one example, the shapes/patterns 150B are in a size so that when an end of the drum stick comes in contact with the shapes/patterns 150B, a sufficient surface area of the covering-like and/or sleeve-like structure 150A comes in contact with the end of the drum stick to create sufficient friction so that when the user pushes on the drum stick, the drum stick can rotate the tempo controller 150. In another example, as shown in FIG. 1, the tempo controller does not include a sleeve-like structure 150A; however, the tempo controller 150 can include at least one depression having a sufficient size and depth such that when an end of a drum stick comes in contact with the depression, a sufficient surface area of the tempo controller 150 comes in contact with the end of the drum stick to create sufficient friction so that when the user pushes on the drum stick, the drum stick can rotate the tempo controller 150.

In an embodiment, as shown in FIGS. 3A and 3B, the tempo beats can be illustrated on the body 102. In this embodiment, the body 102 or at least a portion of the body 102 can be made of a material that can display an image, numbers, and/or letters. In one example, as show in FIG. 2A, three sides of the body 102 can be made of a first material and the forth side 102C can be made of a second material capable of displaying an image, number, or letter. In this exemplary embodiment, the forth side 102C that is made of a second material, can have a display 160 (FIG. 4) and logic board capable of displaying an image, number, or letter on the second material. In an embodiment, the logic board is connected to the forth side 102C. The logic board can be incorporated into a PCB having the controller 130 or can be a separate board that can be in communication with the controller 130.

Referring to FIGS. 3A and 3B, a volume controller 140 can be positioned on a part of the body 102. For example, the volume controller 140 can be on one of the side walls making the body 102 or can be at one of the end caps 107, 109. In one example, as shown in FIGS. 3A and 3B, the volume controller can have an increase volume button and a decrease volume button. The volume button can be in any shape such as a triangle, as shown in FIG. 3A. In another example, the volume controller can be in a form of a knob that can be rotated in a first direction to increase the volume of the tempo and can be rotated in a second direction to decrease the volume of the tempo. Other types of volume controllers can also be incorporated into the metronome 100. Such volume controllers include, but are not limited to buttons, dials, knobs, rockers, or other devices.

In an embodiment, as shown in FIGS. 3A and 3B, the body 102 and the knob 150 of the metronome 100 can be at least partially encapsulated or covered by a material 104. The material 104 can be made of a material that is capable of absorbing or reducing the force of an impact by a drum stick or other instruments on the metronome 100. In one example, the cover is designed to be at least partially transparent or at least allow the display to visible though the impact absorbing material 104. An example of such a material is, but not limited to, silicone, rubber, cloth, vinyl, leather, and/or metal to name a few.

Figure 4A:
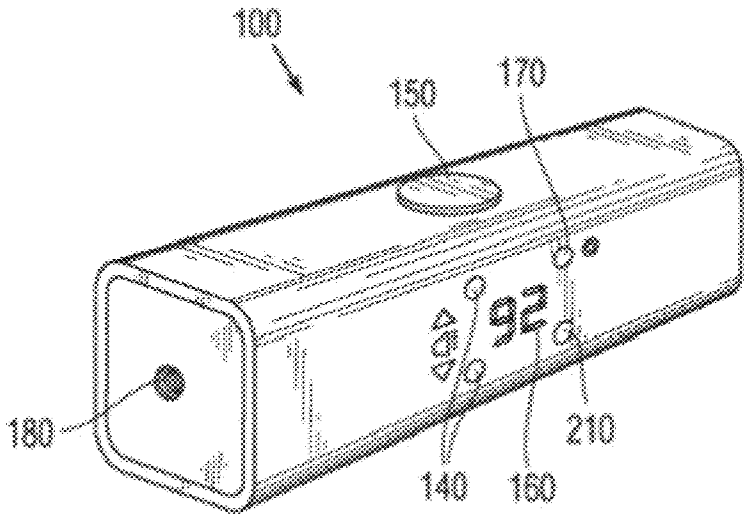
FIG. 4A is a front perspective view of another exemplary metronome.

In an embodiment, as shown in FIG. 4A, the metronome 100 can include an accent controller 210. The accent controller 210 can be positioned anywhere on the metronome 100, such as on the body 102 or on one of the caps 107, 109.

Figure 4B:
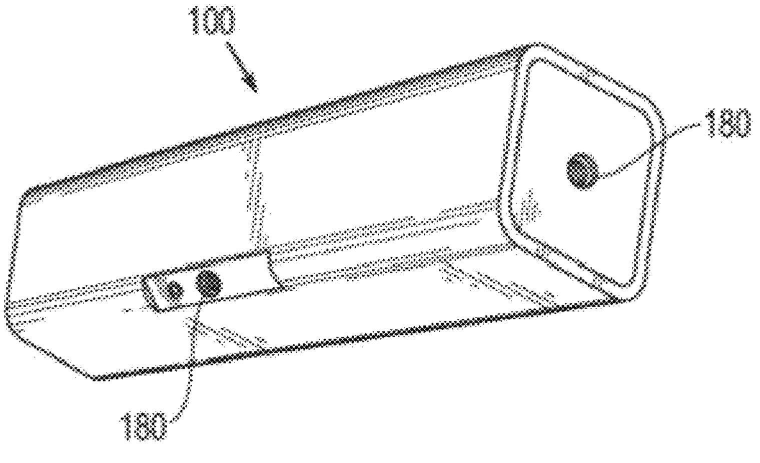
FIG. 4B is a back perspective view of exemplary metronome of FIG. 4A.

In an embodiment, as shown in FIG. 4B, the metronome 100 can have at least one stand screw 180. The stand screw 180 can be configured anywhere on the metronome 100. For example, it can be configured on one of the caps 107 and 109, or on one of the edges of the body 102.

In an embodiment, to turn on the metronome 100, the user can press the power button or the on/off switch 170. When the power is first turned on, the display 160 turns on. The display 160 can indicate that the metronome 100 is turned on by displaying a set of numbers, for example, the display 160 can display an indicator, such as a number, letter, or symbol. For example it can display the number "0000" to illustrate to the user that the display 160 is in a working condition. The display can also show a message, such as "HIT "DRUM "TO" "MUTE." Other messages can also be programmed to be displayed. After the preprogrammed message has been displayed, the metronome 100 can go into standby mode with a default tempo displaying on the display 160. For example, if the default tempo is 120 beats per minute, the display 160 can show the number "120." When the default tempo is first displayed, the metronome 100 can be programmed so that the speaker does not generate the sound of the default tempo. In another example, the metronome 100 can be programmed so that the speaker does generate the sound of the default tempo when the metronome 100 is first turned on. When the default program is such that the metronome 100 does not sound the beats of the default tempo, the user can start the sound by striking the metronome 100 by the drum stick. To change the tempo, the user can strike the metronome 100 several times. The metronome 100 takes the average of the time between each strike and the tempo and will then play the new tempo. If no headphone is connected to the audio jack input 109C, the sound can be heard through the speaker 120. In another example, if the headphone is connected to the audio jack input 109C, then the sound can be heard only through the headphone and no sound can be heard from the speaker 120. In one example, when the tempo sound is activated, the only way to turn the sound on or off can be by hitting the metronome 100, by pressing the on/off switch 170, or by pressing on the volume button 140 until the sound can no longer be heard.

In one embodiment, when the metronome 100 is making a sound, the user can stop the sound by striking the metronome 100. After the metronome 100 has been struck, the sound mutes; however, the display 160 can still illustrate the beats per minute of the tempo that can be heard from the metronome 100 if it gets hit again to unmute or activate the metronome 100.

In one embodiment, a single button or knob can activate and/or control a plurality of functions. For example, the tempo controller 150 can be programed such that by selecting a first function, the tempo controller 150 can function as a volume controller and in a second function the tempo controller 150 can function as a tempo controller. In this particular example, the metronome 100 can have a select functionality button or a function selector button. In another example, the sensor 110 of the metronome 100 can be programed such that if the drum stick is rolled or glided on the metronome 100, the functionality can change.

Example

In one example, if the metronome 100 is muted but the display 160 illustrates the tempo, the sound emission can be re-activated by either striking the metronome 100 or by pressing the volume controller 140 to increase or decrease the volume. In one example, as the volume controller 140 is pressed the display 160 can illustrate a number associated with the level of the volume. The volume numbers can range from 1 to 10 with "1" being mute and "10" being the loudest sound the speaker 120 is capable of generating.

To change the tempo, the user can turn the tempo controller 150. For example, turning the tempo controller 150 clockwise can increase the tempo, while turning the tempo controller 150 counter-clockwise can decrease the tempo. The display 160 can illustrate the tempo as the user turns the tempo controller 150. The tempo controller can be turned by using a musical instrument, such as a drum stick, or by hand.

At the end of a session, the user can turn off the metronome 100 by pressing the on/off switch 170. By pressing the on/off switch 170 to turn off the metronome 100, the display 160 can illustrate a message such as, for non-limiting example "BYE," "DRUM," "DONE," "BEER," and "REST" to name a few. When the metronome 100 is off, the display 160 can be blank.

In an embodiment, the tempo can increment evenly as the user turns the tempo controller 150, or progressively accelerate or decelerate as the user turns the tempo controller 150 faster or slower either by hand or his musical instrument.

In another embodiment, the tempo can be changed by the user striking the metronome 100 a plurality of times, which is sensed by the sensor 110 causing the sensor 110 to send a signal to the controller 130. The metronome 100 can take the average time between per each of the plurality of strikes as the tempo and continue playing the tempo.

In one embodiment, at the start of each session, when the metronome 100 is first turned on, the display 160 can illustrate the battery level. The controller 130 can also run a self-diagnostic before start of each session to confirm that the metronome 100 is in working condition. In one example, if the metronome is not in a working condition, the display can state the reason for the metronome 100 not working properly, by flashing the display, or displaying a different color. Alternatively, if the controller 130 discovers an issue with metronome 100, the speaker 120 can generate a sound.

In an embodiment, other messages can be depicted on the display. In one example, the messages can be stored in a memory that is incorporated in the controller 130 and can be depicted on the display when certain conditions occur. For example, when the device is about to turn on or off the display can depict the word "ON" or "OFF" respectively. In another example, when the controller determines that the battery charge level has reached a predetermined lever, such as 10%, a message such as "10% PWR LIFE LEFT" or "5 MIN of PLAY TIME LEFT."

Other messages, sounds, and/or information can be programmed by connecting the metronome 100 via its USB port 190 to a device. Additionally, the USB port 190 can be connected to a power source to recharge the power source 172 of the metronome 100. In one example, the metronome 100 via its USB port 190 can be connected to a computer device, such as a tablet, laptop, desktop, and/or a smart phone. The computer device can have a program or an application that allows the user to program the metronome 100. For example, it can allow the user to program a list of tempo settings. In one example, the metronome 100 can be programmed such that when the user applies a single strike to the metronome 100 the metronome 100 can play a first tempo. In the same example, if the user applies two consecutive strikes to the metronome 100, then the metronome can play a second pre-programmed tempo different from the first tempo. If the user applies three consecutive strikes to the metronome 100, then the metronome can play a third pre-programmed tempo different from the second tempo. The third tempo can be similar to the first tempo or can be different from the first tempo, depending the user's applied settings while the metronome 100 was connected to a computer. In an alternative embodiment, the metronome 100 can be programmed such that if it is hit in a first area, then the metronome can play a first tempo and if it is hit in a second area, the metronome 100 can play a second tempo and so on. In another example, the metronome 100 can be programmed to take the average time between each of the plurality of strikes and the tempo and continue playing the tempo.

In an embodiment, a drummer who is preparing for a live performance has the list of the songs and the order which they will be performed. This is commonly known as a 'set list'. Each song in the set list can have a different tempo. The drummer can pre-program the metronome 100, using the program and/or the application, with the desired tempo settings for the set list. During the performance, the drummer can adjust the tempo to the next or previous song in the set list by striking the metronome 100 in the pre-programmed predetermined area and/or spot.

Figure 5:
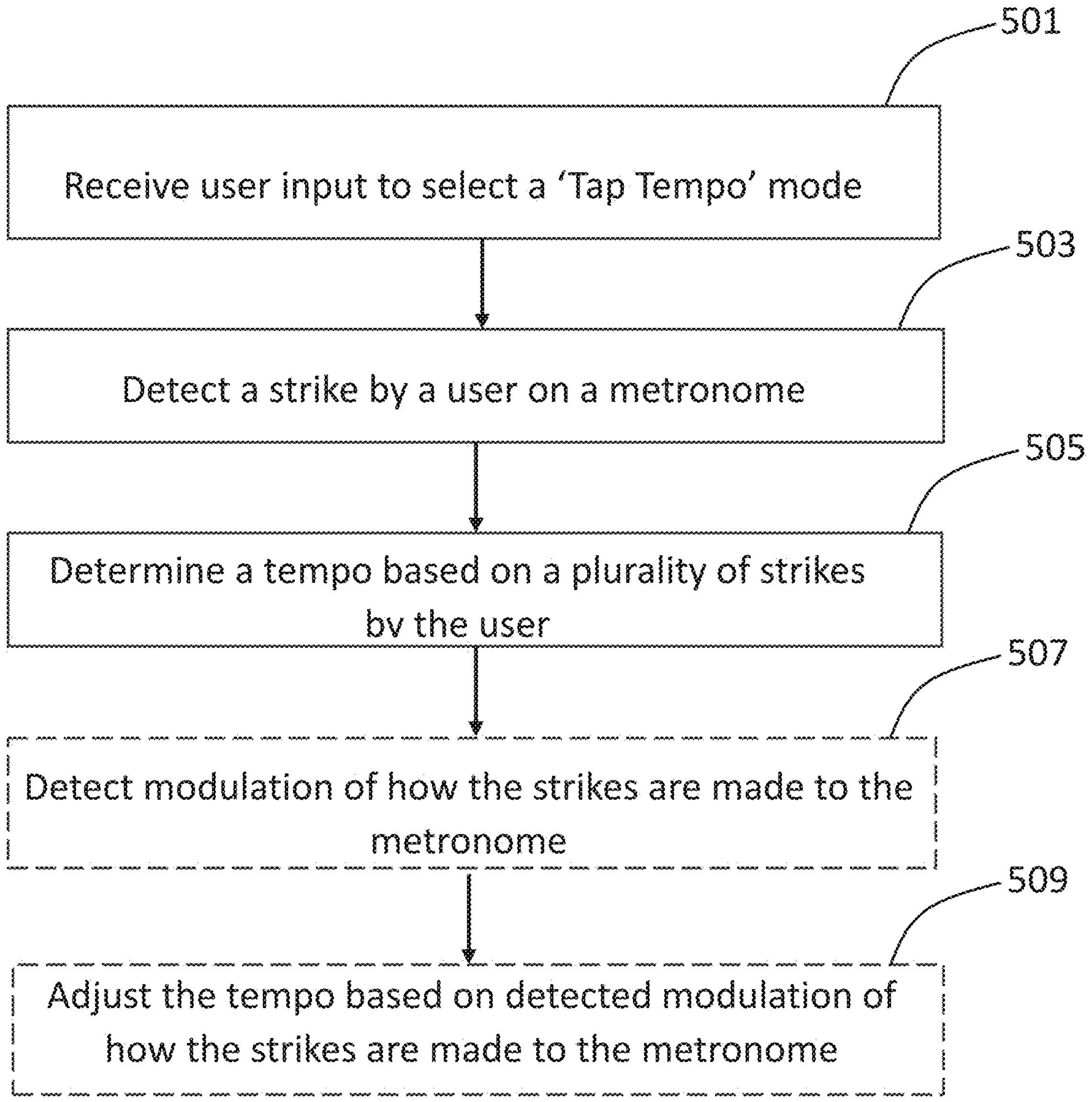
FIG. 5 is an example flowchart of an embodiment of the present disclosure.

FIG. 5 provides an example flowchart for another embodiment of the present disclosure in another aspect. In the example, the metronome 100 may have a normal operation mode or a tap tempo mode, which can be selected by various means, including buttons or touch interfaces on the body of the metronome 100. In one implementation, by selecting the tap tempo mode on the metronome 100, a user may set their desired tempo by repeatedly striking the metronome 100. The word 'tempo' may be defined as a number of beats per minute. For example, a beat every ½ second is a tempo of 120 beats per minute (BPM).

By way of example, when the user of the metronome 100 selects a button for the tap tempo mode, the controller of the metronome 100 may be configured to receive a user input via the button to select the tap tempo mode, at 501. Once in the tap tempo mode, the user may start to strike the body of the metronome 100. As the user strikes the metronome 100, a tempo may be set by averaging the time duration in-between a predetermined number of consecutive strikes, for example, 4 strikes. The controller of the metronome 100 is configured to detect one or more strikes by the user on the body of the metronome 100, via one or more sensors coupled to the body of the metronome 100. As the user continues to strike the body of the metronome 100, the tempo is adjusted based on the previous strikes, for example, the previous 4 strikes. This adjustment may continue indefinitely as long as the user continues to strike on the body of the metronome 100 within a predetermined number of beats. In the example, the controller of the metronome 100 is configured to detect the one or more strikes by the user on the body of the metronome 100, as at 503, and to determine or compute the tempo based on a predetermined number of a plurality of strikes, as at 505.

Further, in an aspect of the present disclosure, by modulating how quickly or slowly the user strikes the body of the metronome 100, the user may adjust the tempo. That is, the user may increase the tempo by striking the metronome 100 more quickly or decrease the tempo by striking the metronome 100 more slowly. As long as the user continues to strike the metronome 100, the user may continue to adjust the tempo until the user have arrived at a desired tempo. As such, in FIG. 5, the controller of the metronome 100 may be optionally configured to detect the modulation of how the strikes are made to the body of the metronome 100 and adjust the tempo accordingly based on the detected modulation of how the strikes are made to the body of the metronome 100, as at 507 and 509. Further, if the user does not strike the metronome 100 after another predetermined number of beats or a plurality of consecutive beats, for example, after 3 consecutive beats, the tempo may be saved in memory as a current tempo setting and the metronome 100 may exit its tap tempo mode and return to its regular operation mode.

In another aspect of the present disclosure, the ability to adjust the tempo by modulating the speed of the strikes made by the user may rely on defining a buffer window before and after the metronome 100 plays a beat. While the user strikes on the body of the metronome 100 in the tap tempo mode, the metronome 100 is configured to play a series of beats at a defined tempo BPM rate, for example, based on the previous 4 strikes as noted in the above example. As such, the buffer may be a defined period of time before and after the metronome 100 plays any one single beat.

Furthermore, in another aspect of the present disclosure, if the user strikes the body of the metronome 100 within a buffer window before the metronome 100 plays a beat, in order to increase the tempo setting, the user's strike may override the beat that the metronome is about to play in a sequence of beats that is defined by the current tempo setting. The override may increase the tempo setting as it comes before the beat that the metronome 100 is about to play. In an inverse case, on the other hand, if the user strikes the body of the metronome 100 within the buffer window after the metronome 100 plays a beat, the user's strike may override the beat that the metronome 100 just played and thus decreases the tempo setting. Further, if the user strikes the body of the metronome 100 at the same moment that the metronome 100 plays a beat, the user's strike may still override the metronome's beat but there will be no change to the tempo setting as the strike comes at the same time as the beat was played.

Figure 6:
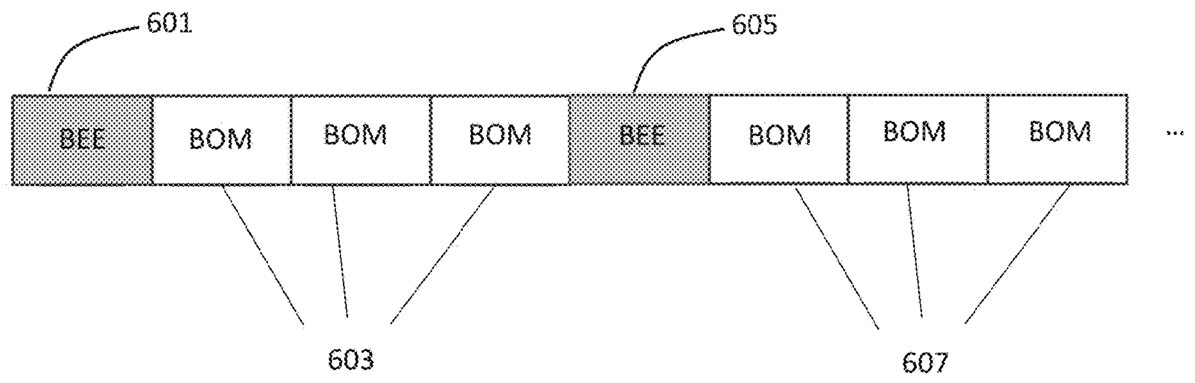
FIG. 6 is a diagram conceptually illustrating an aspect of the present disclosure.

FIG. 6 illustrates a diagram conceptually illustrating another embodiment of the present disclosure. In an aspect of the present disclosure, a user of the metronome 100 may select an accent beat rate on the metronome 100. In the present disclosure, an accent beat may be defined as a beat that has a distinct sound different from regular beats that the metronome 100 plays. In one example, the user may select the accent beat rate by pressing one or more buttons or selecting touch interfaces on the body of the metronome 100. The accent beat may be used to define a particular time signature. For example, a 4/4 time signature (4 beats to a measure of music) may be defined by an accent beat rate of 4. In this example, as shown in FIG. 6, the first beat (e.g., 601 and 605) is the accent beat and the next 3 beats are regular beats (e.g., 603 and 607), as in BEE BOM BOM BOM BEE BOM BOM BOM BEE BOM BOM BOM and so forth. Accent beats may apply whenever the metronome 100 is playing a sequence of beats whether it be during the regular operation mode or tap tempo mode. In the tap tempo mode, the accent beat rate may be constant but the beats may be defined by the metronome 100 or the user. Further, when the tap tempo mode is selected by the user, the controller of the metronome is configured to enter into the tap tempo mode. After selecting the tap tempo mode, when the user strikes the metronome 100 for the very first time this becomes the first beat in the coming sequence of beats. The first beat is thus considered as the accent beat and the metronome 100 plays the accent beat sound. And all following beats are played per the accent beat rate, that is, for example, every $4^{th}$ beat is accented when the accent beat rate is set to 4.

Further, in another aspect of the present disclosure, as mentioned above, when the user strikes the body of the metronome 100 in a buffer window before or after a beat, in order to adjust the tempo up or down, the user's strike may override the metronome's beat and thus adjusts the tempo accordingly, either slower or faster. This override function may apply to the accent beat sequence. In the example, the user's strikes take the place of the metronome's beat in the accent beat sequence. Thus, in this way, the accent beat sequence, for example, every $4^{th}$ beat is accented, may remain in tact despite there being two separate beats, the user's strike and the metronome's beat per the current tempo setting. For the user, the time signature is preserved while the user is adjusting the tempo setting by repeatedly striking the body of the metronome 100.

It is to be understood that both the foregoing description and the following detailed description are exemplary and explanatory only, and are intended to provide an explanation of various embodiments of the present teachings.

From the foregoing description, those skilled in the art can appreciate that the present teachings can be implemented in a variety of forms. Therefore, while these teachings have been described in connection with particular embodiments and examples thereof, the true scope of the present teachings should not be so limited. Various changes and modifications can be made without departing from the scope of the teachings as described herein.

The scope disclosure is to be broadly construed. It is intended that this disclosure discloses equivalents, means, systems and methods to achieve the devices, activities and mechanical actions disclosed herein. For each device, article, method, mean, mechanical element or mechanism disclosed, it is intended that this disclosure also encompasses in its disclosure and teaches equivalents, means, systems and methods for practicing the many aspects, mechanisms and devices disclosed herein. Additionally, this disclosure regards a metronome and its many aspects, features and elements. Such a device can be dynamic in its use and operation, and this disclosure is intended to encompass the equivalents, means, systems and methods of the use of the device and/or article of manufacture and its many aspects consistent with the description and spirit of the operations and functions disclosed herein. The claims of this application are likewise to be broadly construed.

The description of the inventions herein in their many embodiments is merely exemplary in nature and, thus, variations that do not depart from the gist of the inventions are intended to be within the scope of the inventions. Such variations are not to be regarded as a departure from the spirit and scope of the inventions.

What is claimed is:

1. A metronome for use by a user, the metronome comprising:

a body;

a sensor coupled to the body and configured to detect one or more strikes on the body; and a controller in communication with the sensor, wherein the controller is configured to:

receive a first user input to select and enter into a tap tempo mode;

detect, via the sensor, a strike by the user on the body of the metronome;

determine a tempo based on a plurality of strikes by the user, the tempo being used as a number of beats per minute;

detect modulation of how the strikes are made on the body of the metronome; and automatically adjust the tempo based on the detected modulation of the strikes by the user, and wherein the controller is further configured to:

play regular beats; and while the controller plays the regular beats, receive a second user input to select an accent beat rate which is a beat that has a distinct sound different from the regular beats; and play the accent beat among the regular beats as a time signature.

2. The metronome of claim 1, wherein the tempo is determined based on a predetermined number of consecutive strikes by the user on the body of the metronome.

3. The metronome of claim 1, wherein the tempo is increased or decreased when the speed of the strikes is increased or decreased.

4. The metronome of claim 1, wherein when no strike by the user is detected after a plurality of consecutive beats, the controller of the metronome is further configured to save the tempo as a current tempo setting and exit the tap tempo mode of the metronome.

5. The metronome of claim 4, wherein the plurality of consecutive beats comprises three consecutive beats.

6. The metronome of claim 1, wherein the controller of the metronome is further configured to apply the accent beat when the metronome plays a sequence of beats during a regular operation mode or the tap tempo mode of the metronome.

* * * * *